United States Patent
Gudmundsson et al.

(10) Patent No.: US 7,005,863 B2
(45) Date of Patent: Feb. 28, 2006

(54) MONITORING SYSTEM

(75) Inventors: Michael Gudmundsson, Ludvika (SE); Sara Nordin, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/470,063

(22) PCT Filed: Jan. 23, 2002

(86) PCT No.: PCT/SE02/00106

§ 371 (c)(1),
(2), (4) Date: Jul. 24, 2003

(87) PCT Pub. No.: WO02/061904

PCT Pub. Date: Aug. 8, 2002

(65) Prior Publication Data

US 2004/0066598 A1    Apr. 8, 2004

(30) Foreign Application Priority Data

Jan. 29, 2001    (SE) .................................. 0100237

(51) Int. Cl.
*G01R 31/02* (2006.01)
*G01R 31/28* (2006.01)
*H02H 3/22* (2006.01)

(52) U.S. Cl. ...................... 324/549; 324/530; 361/117

(58) Field of Classification Search ................. 324/72, 324/72.5, 102, 452, 510, 529, 530, 457, 549; 361/117, 127

See application file for complete search history.

(56) References Cited

U.S. PATENT DOCUMENTS

| | | | | |
|---|---|---|---|---|
| 3,443,223 A | * | 5/1969 | Kennon | 324/72 |
| 4,338,648 A | * | 7/1982 | Subbarao | 361/127 |
| 4,507,701 A | * | 3/1985 | Fujiwara et al. | 361/127 |

(Continued)

FOREIGN PATENT DOCUMENTS

DE    1 588 142    9/1970

(Continued)

*Primary Examiner*—Anjan Deb
(74) *Attorney, Agent, or Firm*—Dykema Gossett, PLLC

(57) ABSTRACT

The invention relates to a device for monitoring a surge arrester connected to a power network, comprising a registering unit (1) and means (63, 66) for attachment of the registering unit to the surge arrester. The registering unit comprises a grounding line (16), which is adapted to conduct a current flowing through the surge arrester to ground, means (4) for registration of a current passing through the gounding line (16) from the surge arrester, a member (9) for registration of current pulses passing through the surge arrester, and a storage member (5) for storing data concerning the current passing through the grounding line (16) from the surge arrester and data concerning registered current pulses. The registering unit (1) further comprises a field probe (17) connected to ground, a sensor (18) for registration of the current flowing between the field probe (17) and ground, and a time meter (3), the storage member (5) being adapted to store the data concerning the current passing through the grounding line (16) from the surge arrester and the data concerning the current flowing between the field probe 817) and ground associated to a time information determined by means of the time meter (3). The invention also relates to a system comprising one or several such registering units.

35 Claims, 4 Drawing Sheets

U.S. PATENT DOCUMENTS

| | | | |
|---|---|---|---|
| 4,577,148 A * | 3/1986 | Sweetana | 324/72 |
| 4,796,283 A | 1/1989 | Brunner et al. | 377/6 |
| 4,823,228 A * | 4/1989 | Bittner | 361/218 |
| 4,866,393 A * | 9/1989 | Iwai et al. | 324/549 |
| 5,929,625 A | 7/1999 | Lewiner et al. | 324/72 |

FOREIGN PATENT DOCUMENTS

| | | |
|---|---|---|
| EP | 0 190 547 | 8/1986 |
| EP | 497752 A2 * | 8/1992 |
| FR | 2 374 783 | 7/1978 |

* cited by examiner

MONITORING SYSTEM

FIELD OF THE INVENTION AND PRIOR ART

The present invention relates to a device according to the preamble of the subsequent claim 1 for monitoring a surge arrester connected to a power network. The invention also relates to a system for monitoring one or several surge arresters connected to a power network.

The invention is mainly intended to be used for monitoring gapless so-called zinc oxide surge arresters.

The power networks of today constitute large investments in time and installations. Therefor, unscheduled shutdowns normally imply very large losses in income. This is particularly serious when shutdowns are caused by defect network components, since costs for replacement and/or reparation of installations will be added in such cases. Many industrial processes are completely dependent on a secure access to current. In order stand up to these requirements, different types of equipment are introduced to monitor different processes in the power network. Of particular interest are processes characterising abnormal conditions in the power network. Such transient and/or intermittent processes often constitute the large risks concerning the functionality of the power network. Such transient and/or intermittent processes can for instance be constituted by overvoltages, for instance caused by strokes of lightning or the like, switching on or switching off of large power consumers, switchings in switch gears etc.

Different types of surge arresters are today used in switchgears in order to protect equipment against incoming overvoltages. The surge arresters are connected between live wires and ground. The new generation of surge arresters is a gapless arrester with series connected zinc oxide varistors. When the voltage level is too high, the surge arresters will allow the current to be conducted to ground, whereby the overvoltage is reduced. The current-voltage characteristic of the zinc oxide varistors is such that the diverted current increases very rapidly at voltages that are only slightly enhanced. At a continuous operating voltage, these surge arresters consume currents in the-order of 1 mA. Even when the highest occurring lightning currents are discharged through the surge arresters, the voltage is increased to only 2 to 2.5 times the normal.

A control of occurring overvoltages having an energy content that is substantial as concerns surge arresters is today normally carried out by means of so-called surge counters, which are connected to the grounding circuit of a surge arrester. The surge counter gives information about the extent to which the installation is subjected to overvoltages and also serves as a monitoring member for the surge arrester in such a way that an exceptional number of registered overvoltages during a certain period of time should cause servicing and checking of the surge arrester. A surge counter is normally provided with a relay that counts the number of surges passing through the surge arrester. The counter is normally sensitive to the energy content of the overvoltage and the counting function is activated when certain predetermined values with respect to the amplitude and/or duration of the current pulse are exceeded. Surge counters according to the state of the art often have a display that shows the number of registered surges.

In a zinc oxide surge arrester, the varistors are continuously subjected to an operating voltage causing a continuous current in the order of 1 mA to flow through the surge arrester. This current is under normal operating conditions essentially capacitive but does also contain a smaller resistive component of some tens $\mu$A. It is only changes in the resistive current component that can indicate possible changes in the characteristic of the surge arrester. Zinc oxide surge arresters have a very long service life, but its varistor blocks undergo a slow deterioration resulting in a gradual increase of the resistive leakage current. When the resistive leakage current has increased to a certain level, there is a risk that a thermal racing process occurs, which results in the destruction of the varistor blocks. It is therefor of interest to check the resistive leakage current through the surge arrester. Today this is normally done by fastening an instrument, via an insulated fastening member, to the grounded flange of the surge arrester at the checking occasion, which instrument comprises a so-called field probe. This field probe is intended to pick up the electric field from the power network to which the surge arrester is connected. The instrument further comprises a line, via which the field probe is connected to ground, and a sensor for registering the current flowing between the field probe and ground. Based on the measuring values obtained via this sensor and the measuring values obtained from a further sensor adapted to register the current flowing between the surge arrester and ground, the resistive leakage current of the surge arrester can be calculated with a specific method of calculation.

Under conditions with severe pollution, surge arresters might be partially heated due to transient variations in the voltage distribution caused by external soiling on the casing of the surge arrester. In such cases, the casings of the surge arresters should be cleaned regularly. The layer of soil accumulated on the casing contains conductive and semi-conductive particles, which cause a leakage current to flow via the casing. The leakage current flowing via the casing will be included in the total leakage current through the surge arrester. A sudden increase of the total leakage current through the surge arrester indicates that the casing has been soiled and needs to be cleaned.

Instruments that are connected to the grounding circuit of a surge arrester for measuring the total leakage current through the surge arrester have therefor come into use.

Monitoring devices comprising means for the combined registration of total leakage current through a surge arrest and surge counting have come into use. Such a monitoring device is sold by ABB AB under the name "Surge Arrester Monitoring (SAM)". The device sold by ABB AB comprises a current sensor, which is connected to the grounding line of the surge arrester and is connected to a registering unit via a cable, in which registering unit occurring overvoltages are registered based on the measuring values obtained from the current sensor. Said unit further comprises a storage member for storing data concerning measured values of the total leakage current and data concerning the number of registered overvoltages. The device sold by ABB AB further comprises a reading unit, which is connectable to the registering unit via a cable for transferring data from the registering unit to the reading unit. With this known device, it is not possible to determine the resistive leakage current through the surge arrester. In order to determine the resistive leakage current, it is required that a field probe is fastened to the surge arrester via an insulated fastening member at the checking occasion in the way previously mentioned.

OBJECT OF THE INVENTION

The object of the present invention is to achieve a device for monitoring a surge arrester connected to a power network, which in a simple and functional manner offers the possibility to monitor a surge arrester with respect to the number of occurring overvoltages, the total leakage current through the surge arrester as well as the resistive leakage current through the surge arrester.

SUMMARY OF THE INVENTION

According to the invention, said object is achieved by means of a device having the features defined in claim 1.

Owing to the fact that the registering unit included in the inventional device comprises means for registration of the current flowing from the surge arrester to ground, means for registration of the current flowing between a field probe and ground, and means for storing data concerning these currents associated to a time information determined by means of a time meter, it will be possible to use the data stored in the registering unit in order to calculate, at a later moment, the resistive leakage current through the surge arrester. By means of this time-associated current data, the resistive leakage current can namely be calculated by means of the so-called Method B2 (Third order harmonic analysis with compensation for harmonics in voltage (Amendment 1, Section 6 IEC 60099-5)).

By means of the inventional device it will be possible to avoid the drawbacks and the risks associated with the previously used measuring method with a separate field probe temporarily and manually attached to the surge arrester. Since the surge arresters that are intended to be monitored are connected to high-voltage networks, it is associated with large risks of personal injuries each time a field probe is to be attached to a surge arrester for performing a measuring operation. Furthermore, the temporary and manual attachment of a field probe to a surge arrester implies that it is difficult to achieve exactly the same measuring conditions at each measuring occasion. Since the resistive leakage current through a surge arrester has a relatively low value, even very small changes of the measuring conditions might imply that the values of the resistive leakage current obtained at different measuring occasions do not have such an accuracy that they can be compared with each other with good certainty for determination of how the resistive leakage current through the surge arrester changes by time. These drawbacks and risks can be completely eliminated in that the field probe is integrated in the registering unit, which is intended to be permanently connected to the grounding line of the surge arrester.

According to a preferred embodiment of the invention, the field probe is connected to ground via the grounding line included in the registering unit, which grounding line connects the surge arrester to ground. Hereby, the registering unit only has to have one single connection to ground, which simplifies the construction of the registering unit.

According to a further preferred embodiment of the invention, the field probe is connected to an energy storage medium, a change-over switch being adapted conduct, during periods for current measuring, the current from the field probe to ground via the sensor that is adapted to register the current flowing between the field probe and ground, and to conduct the current from the field probe to the energy storage medium during periods for energy storing. Hereby, the current generated by the field probe can be stored and used for supply of energy to the components included in the registering unit.

According to a further preferred embodiment of the invention, the energy storage medium of the registering unit comprises a supercapacitor, which constitutes a very durable and very efficient energy storage medium that is able to store even the very small currents generated by the field probe.

According to a further preferred embodiment of the invention, the registering unit is provided with at least one solar cell connected to the energy storage medium. Hereby, the charging of the energy storage medium is accelerated, particularly during the light part of the year. To use a field probe and solar cells in combination in order to charge an energy storage medium re-suits in that the registering unit can be self-supporting with respect to energy for operating the components included in the registering unit. The registration of measuring data only needs to take place intermittently and requires very little energy. The energy generated by the field probe is normally enough to operate the components responsible for the registration and storage of measuring data. More energy is required when data is to be transmitted, and the energy generated by the field probe might be too small to make possible data transmission at desired occasions. By means of one or several complementary solar cells, the more powerful energy required for the data transmission is however obtained. The data transmission is normally performed during daytime when the light conditions are such that the required energy can be generated by said solar cells. With the exception for the periodical and short periods of time when measurings are performed, the field probe continuously supplies energy to the registering unit and hereby secures that the registering unit always, even during dark periods of the year and at night, has access to sufficient energy for performing registration and storing of measuring data. Owing to that the registering unit can be made self-supporting on energy in this manner, the registering unit might be completely maintenance-free during its useful life. This useful life is rather limited by the useful life of the energy storage medium, and it is again worth noticing that a supercapacitor has a very long useful life and therefor is very favourable to use as energy storage medium in this connection.

According to a further preferred embodiment of the invention, the means for registration of the current passing through the grounding line from the surge arrester comprises an inductive first sensor for registration of the leakage current flowing through the surge arrester, and an inductive second sensor for registration of current pulses, which sensors each comprises a coil arranged around the grounding line. By using only inductive sensors for the registration of the current flowing in the grounding line, the connection between the surge arrester and ground can be designed completely without any voltage jumps, which contributes to a high security at the occurrence of strong short-circuit currents. The use of a separate sensor for the registration of leakage current and a separate sensor for the registration of current pulses also entails that it will be possible to design the surge counter included in the registering unit in such a way that current pulses of several different strength levels can be separately registered.

According to a further preferred embodiment of the invention, the storage member of the registering unit is adapted to store the data concerning registered current pulses associated to a time information determined by means of the time meter so that this stored data can be related to a specific point of time. Hereby, the possibilities are given to evaluate the registrations very accurately at a later moment and to establish, by comparison with occurrences which have been registered and time-associated in another manner, the reliability of the power network to which the surge arrester associated with the registering unit is connected and the causes for the overvoltages corresponding to the registered current pulses.

According to a further preferred embodiment of the invention, the registering unit comprises a temperature sensor for registration of the ambient temperature, the storage member being adapted to store data concerning temperature information determined by means of the temperature sensor so that the stored data concerning the current passing through the grounding line from the surge arrester and the data concerning the current flowing between the field probe and ground can be related to the temperature that prevailed at the measuring occasion. Hereby, it will be possible, at the later calculation of the resistive leakage current through the surge arrester, to take the influence of the temperature on the measuring values in question into account. This is suitably done by standardisation of the measuring values based on the registered temperature, i.e. recalculation of the measuring values to rated values corresponding to a predetermined temperature level.

According to a further preferred embodiment of the invention, the components included in the registering unit are arranged in a casing, through which the grounding line extends, the casing being adapted to be attached to the surge arrester via the grounding line. Furthermore, the grounding line is designed to be stiff at least in respect of the part of the grounding line that is intended to extend between the casing and the surge arrester, and the casing is fixed to the grounding line in such away that it is essentially immobile in relation to said stiff part, so that the casing, when it is attached to the surge arrester, is carried by the surge arrester via said grounding line in a position that is essentially fixed in relation to the surge arrester. Hereby, the grounding line can consequently be used as a mechanical attachment in order to attach the registering unit to a surge arrester, without the casing, in which the components included in the registering unit are arranged, coming into direct contact with the surge arrester. The casing, and thereby the active components of the registering unit, is simultaneously fixed in its position in relation to the surge arrester, whereby it is secured that the mutual positions between the active components of the registering unit and the surge arrester are the same at different measuring occasions. The expression active components is here intended to include the field probe and the means adapted to register the current flowing through the grounding line from the surge arrester.

According to a further preferred embodiment of the invention, the grounding line is at the end that is intended to face the surge arrester provided with a through hole for receiving a mounting bolt, by means of which the grounding line, and thereby the registering unit, is attachable to a flange of electrically conductive material in the surge arrester. Hereby, the registering unit may easily be attached to a conventional surge arrester provided with a flange, via one of the mounting bolts that fixes the surge arrester to the insulators on which the surge arrester is carried.

According to a further preferred embodiment of the invention, the spaces inside the casing of the registering unit, between the components arranged in the casing and the inner walls of the casing, are filled up with a cast compound, preferably of a rubber or plastic material. Hereby, said components are fixed inside the casing at the same time as they are protected by the cast compound from mechanical influence in the form of impacts and hits. By filling the casing with a cast compound of a material that is impermeable to water, said components are furthermore protected from external environmental influence. This embedment of the components in the casing contributes to a great extent to the achievement of a practically maintenance-free registering unit.

According to a further preferred embodiment of the invention, the registering unit comprises a communication member, preferably in the form of a radio transceiver, for wireless transmission of data stored in the storage member. Hereby, the data stored in the registering unit can be read without reading personnel having to come adjacent to the registering unit and consequently without having to be subjected to the high-voltage environment in the vicinity of the registering unit. Furthermore, the need of cabling is reduced at the same time as the reading can be performed relatively fast. This implies savings concerning installation costs as well as working time.

According to a further preferred embodiment of the invention, the registering unit comprises an activation detector, which is adapted to pick up external enabling signals, a control member connected to the communication member and to the activation detector, which control member is adapted to initiate, based on the enabling signals picked up by the activation detector, the data transmission from the communication member, and a member for permanent storage of an identification code that is unique for the individual registering unit, the control member being adapted to initiate the data transmission from the communication member only when a control signal picked up by the activation detector comprises said identification code. Hereby, the reading personnel can easily initiate the data transmission from a specific registering unit.

The invention also relates to a system according to claim 21 and claim 22, respectively, for monitoring one or several surge arresters connected to a power network, which system comprises an inventional registering unit arranged at each surge arrester and a reading unit comprising means for receiving data stored in the storage members of the registering units and a storage member for storing received data.

Further preferred embodiments of the inventional device and the inventional system will appear from the dependent claims and the subsequent description.

BRIEF DESCRIPTION OF THE DRAWING

The invention will in the following be more closely described by means of embodiment examples, with reference to the enclosed drawing. It is shown in.

DETAILED DESCRIPTION OF PREFERRED EMBODIMENTS

Figure 1:
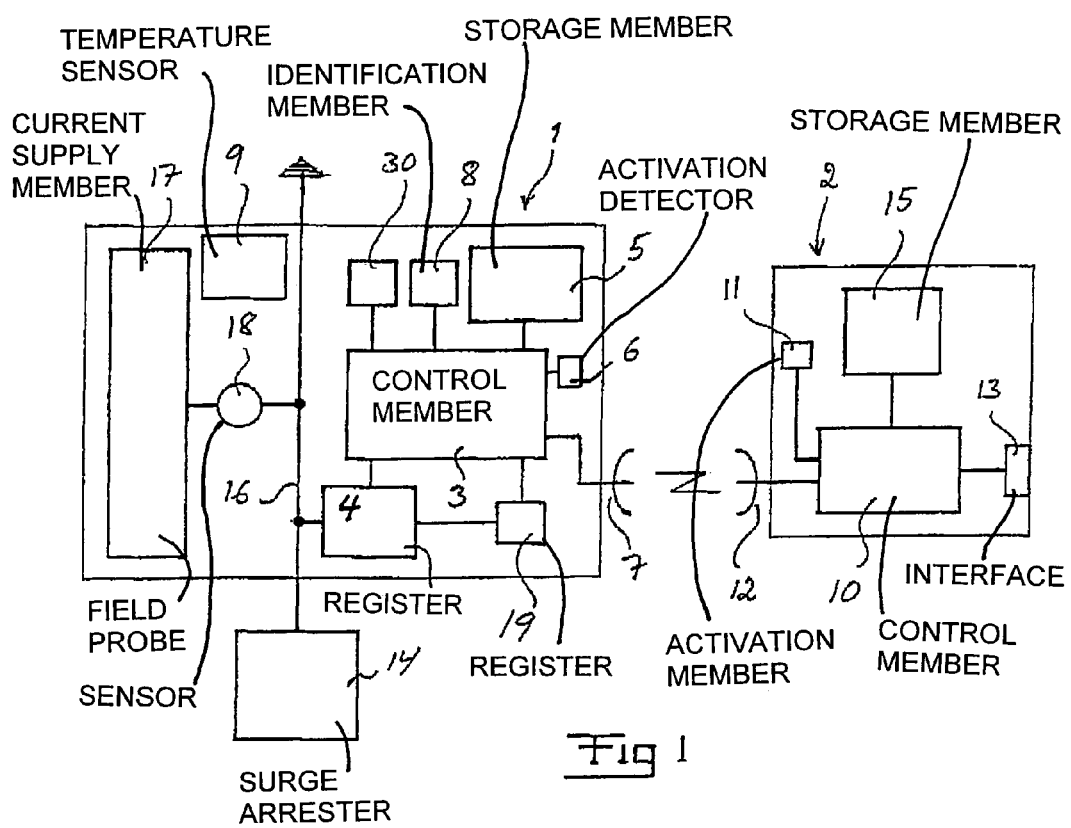
FIG. 1 a schematic block diagram of a registering unit and a reading unit included in a system according to the present invention, FIG. 2 a schematic circuit diagram of the connection to a sensor and to an energy storage medium of a field probe included in a registering unit, FIG. 3 a schematic perspective view of a registering unit attached to a surge arrester, FIG. 4 a schematic, partly cut view illustrating some of the components included in the registering unit according to FIG. 3, FIG. 5 a schematic block diagram illustrating a system according to the present invention, and FIG. 6 a perspective view illustrating a set of units included in a system according to the invention.

FIG. 1 is a very schematic block diagram illustrating a registering unit 1 included in a device according to the invention. A reading unit 2, which together with the registering unit 1 is included in an inventional system, is also illustrated in this block diagram. One and the same reading unit 2 is to be able to operate in due succession together with a number of registering units 1. The registering unit 1 is intended to be connected to a surge arrester 14 in order to register parameters associated with the operation of the surge arrester. For this purpose, the registering unit 1 comprises a grounding line 16, which, when the registering unit 1 is attached to the surge arrester 14, has one of its ends conductively connected to the surge arrester and its other end conductively connected to ground so that a current flowing through the surge arrester will pass through this grounding line 16. A means 4 is adapted to register the electric current that passes to ground via the grounding line 16 from the surge arrester 14. The registering means 4 is connected to a control member 3 adapted to control the operation of the registering unit and to a member 19 adapted to register, based on the registrations of the current passing through the grounding line from the surge arrester, current pulses passing through the surge arrester. Current pulses through the surge arrester are caused by overvoltages occurring in the power network to which the surge arrester is connected. By registration of the number of current pulses passing through the surge arrester, it will consequently be possible to get information about the number of occurring overvoltages.

The control member 3 preferably comprises a microprocessor and clock functions associated thereto. It may also comprise several interconnected microprocessors. The control member 3 can thereby process measuring data obtained from the registering means 4 and, if necessary, add information concerning the point of time for the registration of a specific measuring data. The control member 3 is also responsible for the control of the other members in the registering unit 1.

The registering unit 1 further comprises a storage member 5 for storing of data. Input and writing in the storage member is controlled by the control member 3. An identification member 8 is preferably provided in the registering unit 1. This identification member 8 includes an identification code for the registering unit 1 stored in a permanent manner. The identification code can be read at request by the control member 3, but can not be changed or replaced during operation. The registering unit 1 further comprises a current supply member 9, which is responsible for the current supply to the registering unit and its members. Preferred embodiments of the power supply member are further described below.

The registering unit further comprises a so-called field probe 17, which is connected to ground, preferably via the previously mentioned grounding line 16. The field probe 17 is adapted to generate a current by influence from the electric field from the power network to which the surge arrester 14 is connected, and can be constituted by a plate of electrically conductive material, such as aluminium. The field probe 17 should be arranged on a place at the surge arrester where the electric field from the power network is as large as possible, and it should have a relatively large surface in order to be able to be effectively influenced by said field. A sensor 18 is adapted to register the current flowing between the field probe 17 and ground.

The storage member 5 is adapted to store data concerning the current passing through the grounding line 16 from the surge arrester and data concerning the current flowing between the field probe 17 and ground associated to a time information determined by means of a time meter, so that this stored information can be related to a specific point of time. Said time meter is in the embodiment here shown constituted by the clock functions of the control member.

The registering unit 1 is often placed in an inaccessible manner, and often in the vicinity of high electric voltages. According to a preferred embodiment of the present invention, the registering unit 1 is therefor provided with members for communication with the surrounding world. An activation detector 6 is adapted to receive external signals for starting certain predetermined processes in the control member 3, which is described in more detail below. The activation detector 6 is preferably of a passive type, which does not require any larger power in order to monitor the arrival of signals. A communication member 7 is arranged for wireless transmission of data from the storage member 5 of the registering unit to the reading unit 2. In this way, a remote-controlled reading of data stored in the registering unit is consequently made possible.

The reading unit 2 is electrically completely disengaged from the registering unit 1, and it also comprises a control member 10 responsible for the control of the reading unit 2 and the members included therein. An activation member 11 is arranged for transmission of signals to the activation detector 6 of the registering unit. The operation of the activation member is controlled by the control member 10. A communication member 12 is also included in the reading unit 2. This communication member 12 corresponds to the communication member 7 of the registering unit, and is consequently arranged for wireless reception of data from the communication member 7 of the registering unit. The reading unit 2 is further provided with a storage member 15 for storing received data. However, this communication is preferably bi-directional and adapted to be able to transmit data as well as instructions between the control members 3 and 10. The reading unit 2 is further preferably provided with an interface 13 for communication with external data processing units.

The registering means 4 is responsible for the detection of occurring overvoltage pulses in the connected surge arrester 14. Such overvoltage pulses occurs only at certain irregular occasions, wherefore the registering unit is inactive most of the time. During such periods of inactivation many functions in the control member 3, the registering means 4 and the communication member 7 can be turned off, i.e. be put in an inactive state. This reduces the requirements of current supply to a minimum. When current pulses are registered, the occurrence of the current pulse is used as a starting signal for the registering functions. The registration of current pulses is performed and is preferably stored together with the point of time for its occurrence in the storage member 5. The registration of the surges, i.e. the current pulses, can take place as a simple counting of the number of surges, or as a measuring of for instance the amplitude or the duration of the current or the time variation of the subsequent leakage current.

When a user wants to read remotely the contents in the storage 5 of the registering unit, the reading unit is used. In this case, an enabling signal is emitted via the activation member 11. When the activation detector 6 detects an incoming enabling signal, a transmission sequence is started in the control member 3. The reading unit 2 is preferably also provided with functions that shut off the activation member when the transmission of data starts or after a certain period of time. The activation member is preferably adapted to transmit wireless enabling signals, such as laser light, radio signals, acoustic signals or electromagnetic signals of other wavelengths. As an alternative to initiation of the data transmission from the registering unit by means of an enabling signal, the registering unit. 1 could be adapted to transmit measuring data with predetermined time intervals or in-connection with the registration of a current pulse.

In a typical case, the identification code of the registering unit 1 is transmitted followed by the measuring data that are stored in the storage member 5. The control member 10 of the reading unit controls that the received data is correct and transmits the data further to a data processing unit 31, where an evaluation takes place, or stores the data in the storage member 15 for later transmission to such a data processing unit 31. When the transmission sequence is finished, the registering unit 1 returns to the inactive state, where the current consumption is minimised. The external data processing unit 31 can e.g. comprise a database with existing identification codes or corresponding starting times for the respective processor clocks of the registering unit 1. The time instants for each occurrence can thereby be evaluated for each individual registering unit without any risk of mixing.

The communication member 7 and 12, respectively, is preferably an AM or FM radio transceiver, in which case known radio transmission techniques and radio transmission protocols can be used. Since standard components can be used, the cost for the communication members, the activation member and the activation detector will be very low. It is of course also possible to use other technique of wireless transmission for the data transmission from the registering unit.

The communication members 7 and 12 are suitably adapted for bi-directional communication so that the communication member 7 of the registering unit can transmit measuring data to the reading unit 2 as well as receive control instructions from the reading unit, at the same time as the communication member 12 of the reading unit can receive data from the registering unit 1 as well as transmit control instructions to the registering unit. This enables a more flexible control of the registering unit 1 and a remote-controlled resetting, troubleshooting, control of the current supply level etc.

Figure 2:
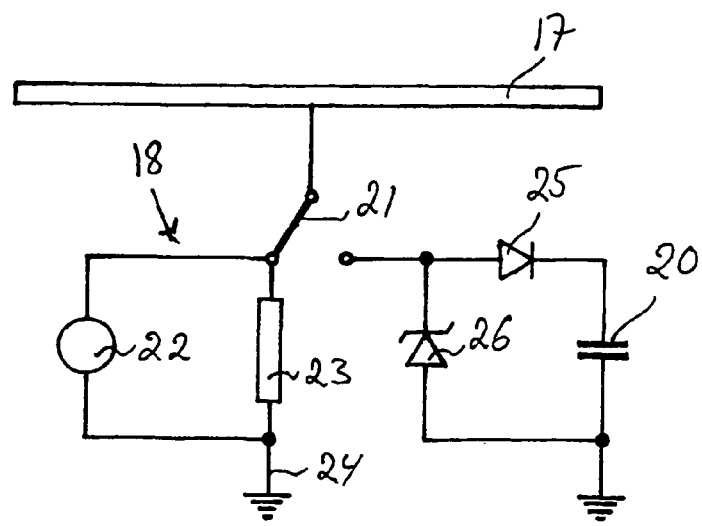

Since the registering unit 1 is in an inactive or low effect state most of the time, where the power consumption can be as low as a few $\mu A$, the average power consumption is of the same order. The current supply member 9 can therefor e.g. consist of a simple lithium battery, which would get an approximate useful life of 10 years. According to a preferred embodiment of the invention, the current supply member 9 instead comprises an energy storage medium, preferably in the form of a large so-called supercapacitor 20, also denominated two-layer capacitor, which is charged by the field probe 17. In this case, the electric field of the power network to which the surge arrester is connected is consequently used for generation of current to the registering unit 1. According to this embodiment, a change-over switch 21 is adapted to conduct the current from the field probe 17 to ground via the previously mentioned sensor 18 during periods for current measuring, and to conduct the current from the field probe 17 to the energy storage medium 20 during periods for energy storing. The electrical circuit via which the field probe 17 is alternatively connected to ground via the sensor 18 or to the energy storage medium 20 is schematically illustrated in FIG. 2. In the shown example, the sensor 18 is constituted by a volt meter 22, which is adapted to measure the voltage across the resistor 23. A value of the current in the line 24 between the field probe 17 and ground is obtained by simple recalculation of the obtained measuring value of the voltage across the resistor 23. In the part of the circuit connecting the field probe 17 to the supercapacitor. 20, a rectifying member 25, such as a diode, for rectification of the current to the supercapacitor and a varistor 26 for limitation of the voltage across the supercapacitor are provided in the shown example. A connection to ground is arranged between the supercapacitor 20 and the varistor 26. This ground connection is suitably connected to the previously mentioned grounding line 16. The change-over switch 21 is suitably controlled by the control member 3. Preferably, one or several solar cells are also connected to the energy storage medium for charging thereof. With the solar cells of today, the charging can be performed relatively rapidly even when the light amounts are moderate, and the energy consumption will normally be of such a magnitude that a fully charged supercapacitor will suffice to give the registering unit 1 current during several days. During periods with little daylight, the field probe guarantees that the energy storage medium 20 is charged with sufficient energy for the performance of registration and storing of measuring data.

Figure 3:
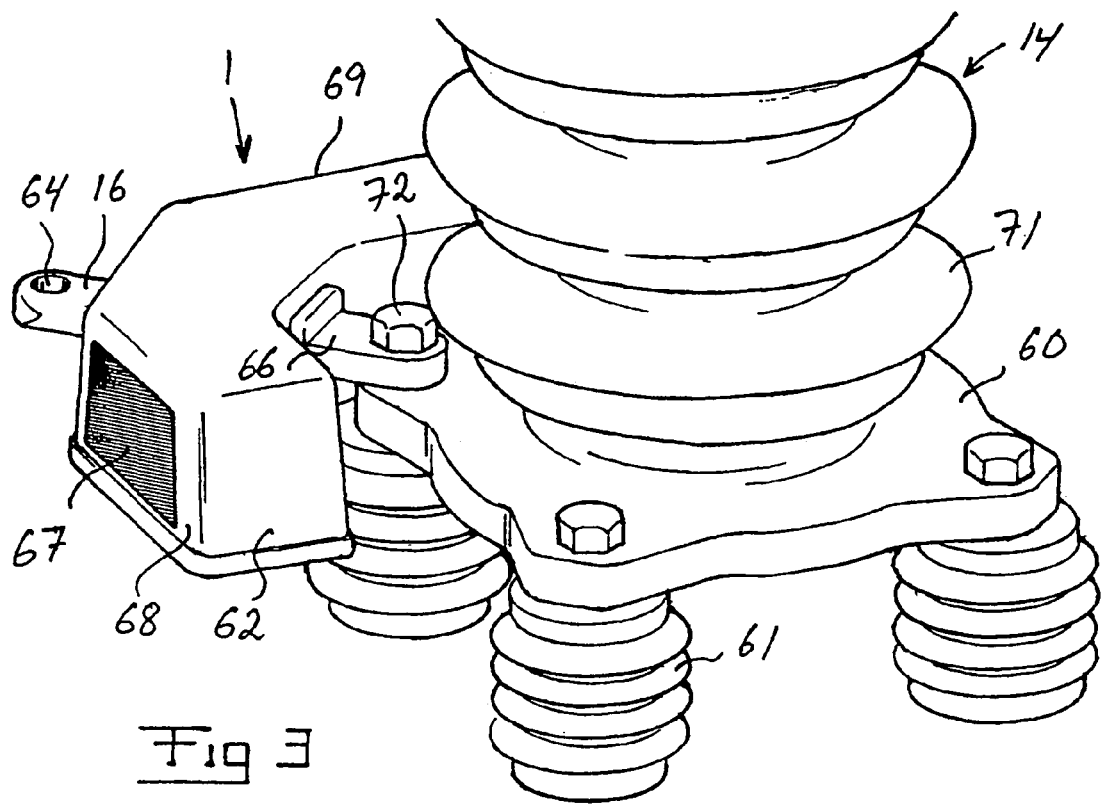

A preferred embodiment of a registering unit 1 included in a device or a system according to the invention is shown in FIG. 3. This registering unit is particularly designed to be used with a surge arrester 14 which is vertically arranged and rests on a number of insulating supports. 61 via a lower flange 60 of electrically conductive material. The registering unit is here provided with a casing 62, through which a grounding line 16 extends. This grounding line 16 is at one of its ends, the end that is intended to face the surge arrester, provided with a fastening member 63, here in the form of a through hole 63 for receiving a mounting bolt 72, by means of which the grounding line 16, and thereby the casing 62, is attachable to the flange 60 of the surge arrester. The grounding line is suitably arranged to be attached to the flange 60 by means of one of the bolts that mounts the flange of the surge arrester to the insulating supports 61. At its other end, the end that is intended to be turned away from the surge arrester, the grounding line 16 is provided with a fastening member 64 for connection of a grounding cable 65 (see FIG. 6). It is of course also possible to let the grounding line 16, which extends through the casing 62, directly pass on to a cable leading to ground. In the embodiment shown in FIG. 3, the registering unit 1 is attached to the flange 60 of the surge arrester only via the grounding line 16, so that the casing 62 and the components arranged therein will not be in direct contact with the surge arrester, wherefore no insulator is required between the surge arrester and the registering unit. In order for the casing, and thereby the active components of the registering unit, to be fixed in its position in relation to the surge arrester when the registering unit is attached to the surge arrester via the grounding line 16, the part 66 of the grounding line that is intended to extend between the casing and the surge arrester is designed to be stiff, at the same time as the casing 62 is fixed to this part 66 in such a way that the casing is immobile or at least essentially mobile in relation to said part 66. In the embodiment shown in FIG. 3, the grounding line is designed to be stiff in its whole extension between the fastening members 63 and 64.

The registering unit 1 shown in FIG. 3 is provided with two solar cells 67 arranged on or in the casing 62, which solar cells are connected to the energy storage medium of the registering unit. These solar cells 67, only one of which appearing in FIG. 3, are disposed on two walls 68, 69 of the casing 62, which walls are essentially vertically arranged and turned away from the surge arrester. One or several solar cells could of course also be disposed at the upper wall of the casing, but this would imply a large risk of the solar cells becoming covered by snow, falling leaves etc. Owing to the fact that the solar cells, as shown in FIG. 3, are directed in different directions, the advantage is achieved that they are able to pick up light inciding from different directions.

Figure 4:
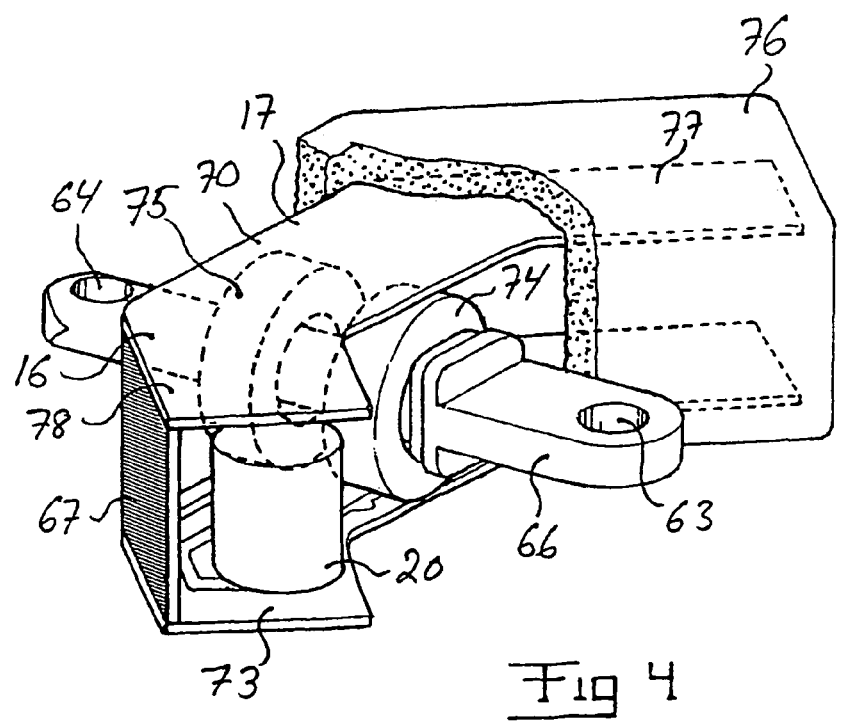

The casing 62 encloses the components that has been described as included in the registering unit 1 schematically illustrated in FIG. 1. Some of these components appear in FIG. 4, for instance the field probe 17, which here consists of a plate, preferably of aluminium, having a U-shape in its essential plane of extension. The field probe 17 is arranged in such a way in the casing 62, that it will extend with its essential plane of extension essentially perpendicular to the longitudinal axis of the surge arrester when the registering unit 1 is attached to the surge arrester, and when the field probe, as shown in FIG. 4, is U-shaped, its shanks. 77, 78 are arranged angled towards the surge arrester. Furthermore, the field probe 17 is so arranged that its upper surface 70 will be located somewhat below the lower part of the casing 71 of the surge arrester, so as to prevent the field probe from being influenced by the function of the surge arrester. A supercapacitor 20 also appears in FIG. 4, which supercapacitor in this embodiment example is disposed on a printed circuit card 73, which suitably has a shape corresponding to the shape of the field probe, as illustrated in the figure.

A sensor 74 included in the registering means 4 also appears in FIG. 4. This sensor is, inductive and consists of a coil arranged around the grounding line 16. According to a preferred embodiment of the invention, the registering means 4 also comprises a second inductive sensor 75 in the form of a coil arranged around the grounding line 16, which sensor 75 is indicated with broken line in FIG. 4. One of the sensors 74, 75 is intended for registration of leakage current. The other of the sensors 74, 75 is connected to the member 19 that is intended to register occurring current pulses, and is together with this member 19 included in the surge counter of the registering unit. This sensor is suitably provided with several windings arranged around an iron core in order to make possible a registration with relatively high resolution of several different current levels of the occurring current pulses. Each winding is connected to a capacitor, which is charged by the current induced in the winding. When the voltage across the capacitor exceeds a certain predetermined threshold value, a level sensing circuit connected to the capacitor is activated, which circuit for instance is in the form of a transistor circuit, this activation being read by the control member 3. Each winding can be connected to one or several level sensing circuits depending on the desired resolution, i.e. how many different current levels of the current pulses through the surge arrester it is desired to register separately and how closely these different current levels are desired to lay. It is of course also possible to design said member 19 in other ways then here described. The strength of a current pulse is directly related to the strength of the overvoltage pulse causing the current pulse, and by determining the strength level of the current pulse the strength level of the corresponding overvoltage can be determined. The calculation of the strength of the overvoltage pulses corresponding to registered current pulses is suitably carried out in the reading unit 2, or more suitable in the data processing unit 31.

In case it is only desired to count the number of occurring overvoltage pulses having a current above one single predetermined level, it is sufficient to let the registering means 4 comprise one single sensor.

The spaces inside the casing 62, between the components arranged in the casing and the inner walls of the casing, are suitably filled up with a cast compound, schematically indicated at 76 in FIG. 4, preferably of a rubber or plastic material. Silicon rubber has proved to be a particularly suitable material for filling up the casing. By consequently being encapsulated by the cast compound, said components are fixed inside the casing 62 at the same time as they are protected by the cast compound from mechanical influence in the form of impacts and hits. By filling the casing with a cast compound 76 of a material impermeable to water, said components are also protected from external environmental influence.

According to a preferred embodiment of the inventional system, the reading unit 2 or the data processing unit 31 is provided with a means for determining a value of the resistive leakage current through the surge arrester. For instance, the control member 10 of the reading unit can be adapted to determine this leakage current. Said means is suitably adapted, based on received data concerning the current passing through the grounding line 16 from the surge arrester and data concerning the current flowing between the field probe 17 and ground, to calculate the third harmonic of the resistive leakage current through the surge arrester, the value of the resistive leakage current through the surge arrester being obtained as a function of said third harmonic. This is a known method for calculation of the resistive leakage current through a surge arrester usually denominated "Method B2" (Third order harmonic analysis with compensation for harmonics in voltage (Amendment 1, Section 6 IEC 600995)). According to this method, the third harmonic of the resistive leakage current through the surge arrester is calculated according to the following formula:

$$\bar{I}_{3r} = \bar{I}_{3t} - K \cdot I_{1t}/I_{1p} \cdot \bar{I}_{3p}$$

In the formula above:

$\bar{I}_{3r}$—indicates the third harmonic of the resistive leakage current through the surge arrester, $I_{1t}$—indicates the amplitude of the total leakage current through the surge arrester (obtained via measurement of the current in the grounding line 16, i.e. via the registering means 4), $I_{1p}$—indicates the amplitude of the current between the field probe 17 and ground (obtained via the sensor 18), $\bar{I}_{3p}$—indicates the third harmonic of the current between the field probe 17 and ground (for instance obtained by Fourier analysis of the measuring values from the sensor 18), $\bar{I}_{3t}$—indicates the third harmonic of the total leakage current through the surge arrester (for instance obtained by Fourier analysis of the measuring values from the registeringr means 4), and K—indicates a constant, which in the case of a surge arrester arranged in three-phase has the value 0,75.

The resistive leakage current through the surge arrester is, as mentioned above, obtained as a function of the calculated third harmonic of the resistive leakage current through the surge arrester. The relation between said third harmonic and the value of the resistive leakage current is specific for each type of surge arrester and is empirically determined by measuring. The relation is temperature dependent. In order to take this into account, the measuring values of the current passing through the grounding line 16 from the surge arrester and the measuring values of the current flowing between the field probe 17 and ground can for instance be recalculated to rated values corresponding to a predetermined temperature level. In order to make possible such a recalculation, the prevailing temperature has to be registered in connection with the registration of said measuring values. For this purpose, the registering unit 1 is suitably provided with a temperature sensor 30 for registration of the ambient temperature, the storage member 5 being adapted to store data concerning temperature information determined by means of the temperature sensor, so that the stored data concerning the current passing through the grounding line from the surge arrester and the stored data concerning the current flowing between the field probe and ground can be related to the temperature that prevailed at the measuring occasion.

The data processing unit 31 is suitably adapted, based on predetermined values of thee resistive leakage current through a surge, arrester, to determine the functionality of the surge arrester and to indicate whether or not said surge arrester is defect and in the need of repairing and/or replacement. Furthermore, the data processing unit 31 is suitably adapted, based on received data concerning the current passing through the grounding line 16 from the surge arrester, which data represent the total leakage current in the surge arrester, to determine and indicate whether or not the casing of the surge arrester needs to be cleaned.

Figure 5:
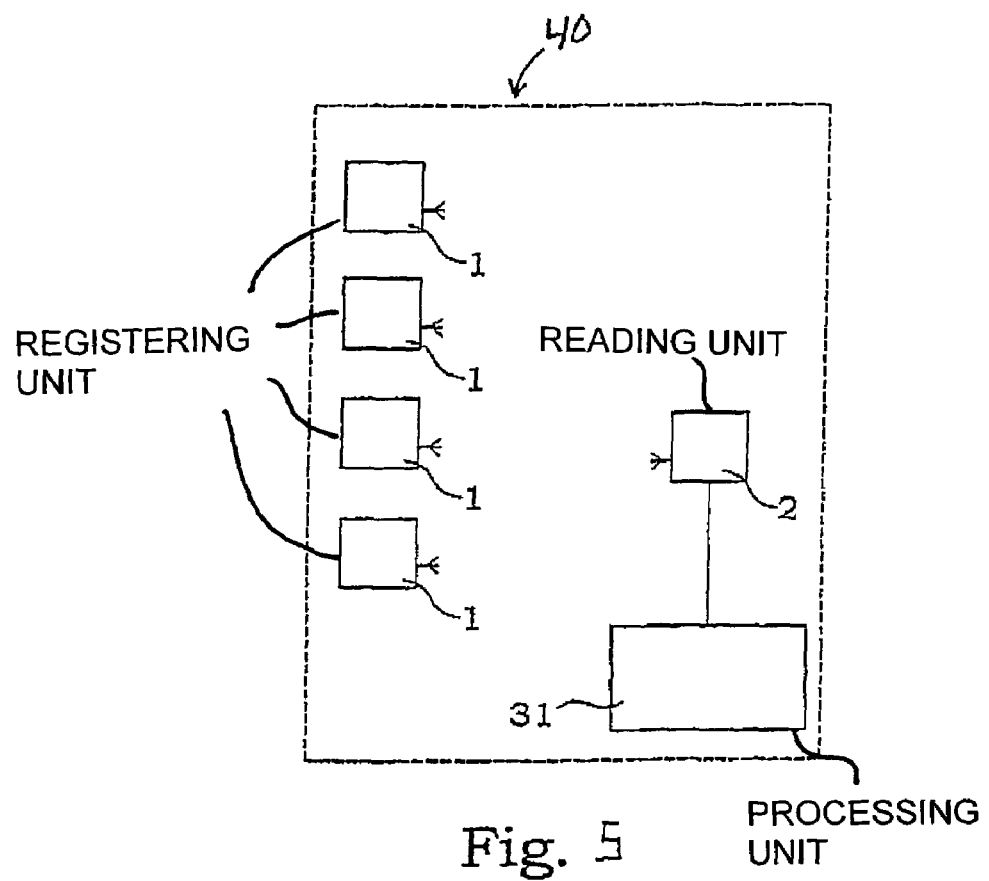

A system 40 according to the present invention for monitoring one or several surge arresters connected to a power network is very schematically illustrated in FIG. 5, and comprises at least one registering unit 1 and at least one reading unit 2. The registering unit 1 is activatable for wireless transmission of measuring data stored therein. One and the same reading unit 2 is with advantage used for several registering units 1, as illustrated in the figure. The reading unit 2 then uses the identification code in order to separate data from the different registering units. The system 40 preferably also comprises at least one data processing unit 31 for processing collected data.

The data processing unit 31 can consist of a conventional computer, such as for instance a PC, which comprises software for processing and analysis of the measuring data collected by means of the registering units. The data processing unit 31 suitably also comprises software for administration of the surge arresters embraced by the system, and can be adapted to store information about the surge arresters, such as for instance information about the location of a specific surge arrester, i.e. at which station and where within the station the surge arrester is located, how the surge arrester is connected, i.e. 1-phase or 3-phase, the type of the surge arrester, identification code, rated voltage etc. Hereby, the data processing unit can be used in order to accurately evaluate the surge arresters and their function, and reports of desired type can be generated either automatically at certain predetermined points of time or states or when need arises.

Figure 6:
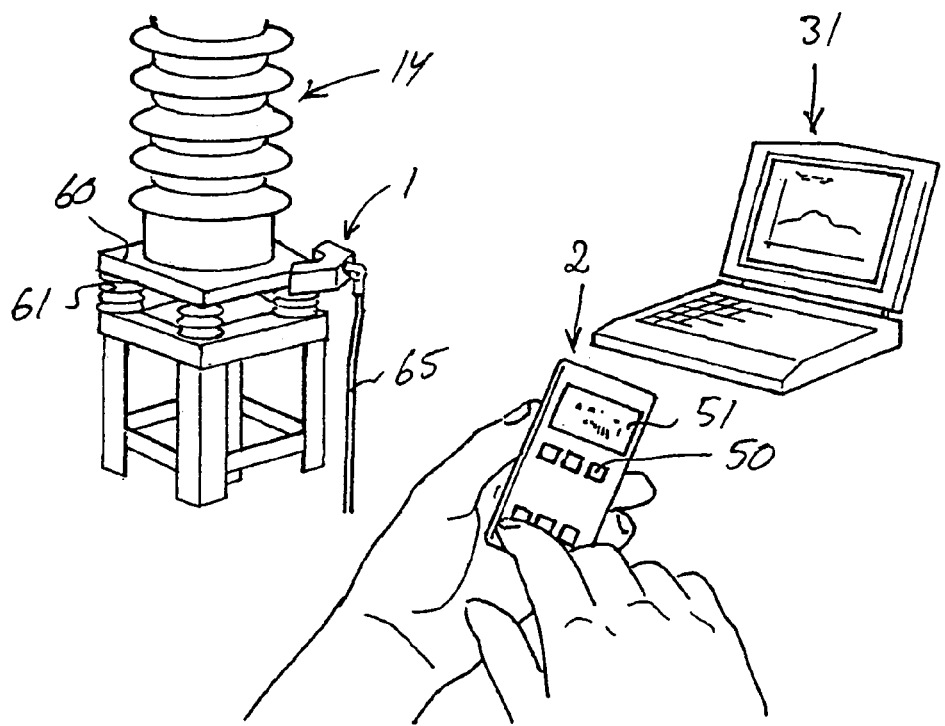

A registering unit 1, a reading unit 2 and a data processing unit 31 included in a system according to the invention are illustrated in FIG. 6. As appears from this figure, the reading unit 2 is suitably provided with a push-button set 50, by means of which an operator can control the processes for transmission of data from a desired registering unit. The reading unit is here also provided with a presentation member in the form of a display 51, via which the operator can check received data in order to determine whether or not this can be assumed to be correct. According to an embodiment of the inventional system, the reading unit also comprises means for processing the received data, whereby the checking of the function of the surge arrester can be carried out directly via the display of the reading unit. In order to simplify the construction of the reading unit and keep the manufacturing costs for the reading unit down, it is however preferred that the major part of the processing and evaluation of registered data is carried out in a separate data processing unit 31, to which data from the registering units are transferred via one or several reading units. The transfer of data from a reading unit to a data processing unit may be carried out either wirelessly or via cable.

According to the preferred embodiment of the invention described above, the registering units 1 and the reading unit 2 are designed for wireless transfer of data. The transfer of data from the registering units could however also take place via a fixed connection, for instance via optical cable. The registering unit could as well be supplied with control instructions via a fixed connection. It is further emphasised that it is quite possible to provide the registering unit with presentation members for display of registered measuring data, and with means for processing and evaluating registered measuring data.

The invention is of course, not in any way limited to the preferred embodiments described above; several possibilities to modifications thereof should on the contrary be evident to a person skilled in the art, without thereby deviating from the basic idea of the invention as defined in the appended claims.

What is claimed is:

1. A device for monitoring a surge arrester connected to a power network producing an electric field, comprising a registering unit and means for attachment of the registering unit to the surge arrester, the registering unit comprising a grounding line, which is connected or intended to be connected to ground and which is intended to be conductingly connected with the surge arrester when the registering unit is attached to the surge arrester so that a current flowing through the surge arrester will pass through this grounding line, means for registration of a current passing through the grounding line from the surge arrester, a member for registration, based on the registrations of the current passing through the grounding line from the surge arrester, of current pulses passing through the surge arrester, and a storage member for storing data concerning the current passing through the grounding line from the surge arrester and data concerning registered current pulses, wherein the registering unit further comprises a field probe being charged in response to the electric field produced by the network and being connected to ground, the field probe is adapted to generate a current in response to the electric field, a sensor for registration of the current flowing between the field probe and ground, the storage member being adapted to store data concerning the current flowing between the field probe and ground, and a time meter, the storage member being adapted to store the data concerning the current passing through the grounding line from the surge arrester and the data concerning the current flowing between the field probe and ground associated to a time information determined by means of the time meter.

2. A device according to claim 1, wherein the field probe is connected to ground via said grounding line.

3. A device according to claim 1 wherein the field probe is connected to an energy storage medium, a change-over switch being adapted to conduct the current from the field probe to ground via said sensor during periods for current measuring, and to conduct the current from the field probe to the energy storage medium during periods for energy storing.

4. A device according to claim 3, wherein the energy storage medium comprises a supercapacitor.

5. A device according to claim 3, wherein the registering unit is provided with at least one solar cell connected to the energy storage medium.

6. A device according to claim 3, wherein the means for registration of the current passing through the grounding line from the surge arrester comprises an inductive first sensor for registration of the leakage current flowing through the surge arrester and an inductive second sensor for registration of current pulses, each of which comprises a coil arranged around the grounding line.

7. A device according to claim 6, wherein the registering unit is adapted to count the different number of current pulses exceeding different predetermined current levels.

8. A device according to claim 3, wherein the registering unit is adapted to count the number of current pulses exceeding a predetermined current level.

9. A device according to claim 6, wherein the storage member is adapted to store the data concerning registered current pulses associated to a time information determined by means of the time meter.

10. A device-according to claim 6, wherein the registering unit comprises a temperature sensor for registration of the ambient temperature, the storage member being adapted to store data concerning temperature information determined by means of the temperature sensor so that the stored data concerning the current passing through the grounding line from the surge arrester and the data concerning the current flowing between the field probe and ground can be related to the temperature that prevailed at the measuring occasion.

11. A device according to claim 6, wherein components included in the registering unit are arranged in a casing, through which the grounding line extends, the casing being arranged to be attached to the surge arrester via the grounding line, that the grounding line is designed to be stiff at least in respect of the part of the grounding line that is in tended to extend between the casing and the surge arrester, and the casing is fixed to the grounding line in such a way that it is essentially immobile in relation to said stiff part so that the casing, when it is attached to the surge arrester, is carried by the surge arrester via said grounding line in a position that is essentially fixed in relation to the surge arrester.

12. A device according to claim 11, wherein the grounding line, at the end thereof that is intended to face the surge arrester, is provided with a through hole for receiving a mounting bolt, by means of which the grounding line, and thereby the casing, is attachable to a flange of electrically conductive material in the surge arrester.

13. A device according to claim 11, wherein the spaces inside the casing, between the components arranged in the casing and the inner walls of the casing, are filled up with cast compound.

14. A system according to claim 13, wherein the compound is impermeable to water.

15. A device according to claim 11, the registering unit comprises a communication member for wireless transmission of data stored in the storage member.

16. A device according to claim 15, wherein the communication member comprises a radio transceiver.

17. A device according to claim 15, wherein the communication member is adapted for transmission of data as well as receipt of control instructions.

18. A device according to claim 15, wherein the communication member is adapted to transmit data with predetermined time intervals.

19. A device according to claim 15, wherein the communication member is adapted to transmit data in connection with the registration of a current pulse by the registering unit.

20. A device according to claim 15, wherein the registering unit comprises an activation detector, which is adapted pick up external enabling signals, and the registering unit comprises a control member connected to the communication member and to the activation detector, which control member is adapted to initiate the data transmission from the communication member based on the enabling signals picked up by the activation detector.

21. A device according to claim 20, wherein the registering unit comprises a member for permanent storage of an identification code unique for the individual registering unit, the control member being adapted to initiate the data transmission from the communication member only when a controlled signal picked up by the activation detector comprises said identification code.

22. A system for monitoring one or several surge arresters connected to a power network, wherein the system comprises a registering unit according to claim 20 arranged at each surge arrester, the system further comprising a reading unit, which comprises an activation member for transmitting an enabling signal, by means of which a registering unit is activatable for transmission of data stored in the storage member of the registering unit, a communication member for wireless receipt of data from a registering unit activated by means of the enabling signal, and a storage member for storing received data.

23. A system for monitoring one or several surge arresters connected to a power network, wherein the system comprises a registering unit according to claim 1 arranged at each surge arrester, the system further comprising a reading unit, which comprises means for receiving data stored in the storage member of the registering unit and a storage member for storing received data.

24. A system according to claim 23, wherein the communication member of the reading unit comprises a radio transceiver.

25. A system according to claim 23, wherein the communication member of the reading unit is adapted for transmission of control instructions to as well as receipt of data from a registering unit activated by means of the enabling signal.

26. A system according to claim 23, wherein the reading unit comprises means for bringing the enabling signal to comprise a selectable identification code corresponding to an identification code stored in the registering unit that the reading unit is intended to activate at the moment.

27. A system according to claim 26, wherein the reading unit comprises a presentation member (51) for displaying said values.

28. A system according to claim 23, wherein the reading unit comprises means for processing received data concerning the current passing through the grounding line from the surge arrester to values representing the total leakage current through the surge arrester.

29. A system according to claim 28, wherein the means for determining a value of the resistive leakage current through a surge arrester is adapted to calculate, based on received data concerning the current passing through the grounding line from the surge arrester and data concerning the current flowing between the field probe and ground, the third harmonic of the resistive leakage current through the surge arrester, the value of the resistive leakage current through the surge arrester being obtained as a function of said third harmonic.

30. A system according to claim 23, wherein the reading unit comprises means for determining, based on received data concerning the current passing through the grounding line from the surge arrester and data concerning the current flowing between the field probe and ground, a value of the resistive leakage current through the surge arrester.

31. A system according to claim 23, wherein the system comprises a data processing unit, to which data stored in the storage member of the reading unit is transferable, the data processing unit being adapted to store and evaluate said data.

32. A system according to claim 31, wherein the data processing unit is adapted, based on received data concerning the current passing through the grounding line from the surge arrester, to determine and indicate whether or not the casing of the surge arrester needs to be cleaned.

33. A system according to claim 31, wherein the data processing unit comprises means for determining, based on received data concerning the current passing through the grounding line from the surge arrester and data concerning the current flowing between the field probe and ground, a value of the resistive leakage current through the surge arrester.

34. A system according to claim 31, wherein the data processing unit is adapted, based on determined values of the resistive leakage current through the surge arrester, to determine the functionality of the surge arrester and to indicated whether or not said surge arrester is defect.

35. A device for monitoring a surge arrester connected to a power network, comprising a registering unit and means for attachment of the registering unit to the surge arrester, the registering unit comprising a grounding line, which is connected or intended to be connected to ground and which is intended to be conductingly connected with the surge arrester when the registering unit is attached to the surge arrester so that a current flowing through the surge arrester will pass through this grounding line, means for registration of a current passing through the grounding line from the surge arrester, a member for registration, based on the registrations of the current passing through the grounding line from the surge arrester, of current pulses passing through the surge arrester, and a storage member for storing data concerning the current passing through the grounding line from the surge arrester and data concerning registered current pulses, wherein the registering unit further comprises a field probe connected to ground, which field probe is adapted to generate a current by the influence from the electric field from the power network to which the surge arrester is connected, a sensor for registration of the current flowing between the field probe and ground, the storage member being adapted to store data concerning the current flowing between the field probe and ground, and a time meter, the storage member being adapted to store the data concerning the current passing through the grounding line from the surge arrester and the data concerning the current flowing between the field probe and ground associated to a time information determined by means of the time meter; wherein the field probe is connected to an energy storage medium, a change-over switch being adapted to conduct the current from the field probe to ground via said sensor during periods for current measuring, and to conduct the current from the field probe to the energy storage medium during periods for energy storing.

* * * * *